(12) United States Patent
Browne et al.

(10) Patent No.: US 7,275,846 B2
(45) Date of Patent: Oct. 2, 2007

(54) ADAPTIVE HEAD LIGHT AND LENS ASSEMBLIES

(75) Inventors: Alan L. Browne, Grosse Pointe, MI (US); Jan H. Aase, Oakland Township, MI (US); Nancy L. Johnson, Northville, MI (US); Andrew C. Keefe, Santa Monica, CA (US)

(73) Assignee: General Motors Corporation, Detroit, MI (US)

( * ) Notice: Subject to any disclaimer, the term of this patent is extended or adjusted under 35 U.S.C. 154(b) by 91 days.

(21) Appl. No.: 11/078,643

(22) Filed: Mar. 11, 2005

(65) Prior Publication Data

US 2005/0201116 A1  Sep. 15, 2005

Related U.S. Application Data

(60) Provisional application No. 60/552,849, filed on Mar. 12, 2004.

(51) Int. Cl.
  *F21V 17/02* (2006.01)
  *F21V 7/00* (2006.01)
  *B60Q 1/06* (2006.01)
  *B60Q 1/00* (2006.01)
(52) U.S. Cl. .............. 362/512; 362/517; 362/518; 362/467; 362/526
(58) Field of Classification Search ........... 362/286, 362/518, 539, 517, 467, 512, 526
See application file for complete search history.

(56) References Cited

U.S. PATENT DOCUMENTS

| 4,513,358 | A | * | 4/1985 | Lemme | 362/276 |
| 4,556,934 | A | * | 12/1985 | Lemme et al. | 362/279 |
| 4,556,935 | A | * | 12/1985 | Lemme | 362/279 |
| 4,567,549 | A | * | 1/1986 | Lemme | 362/279 |
| 5,063,482 | A | * | 11/1991 | Collot et al. | 362/461 |
| 6,422,726 | B1 | * | 7/2002 | Tatsukawa et al. | 362/517 |
| 6,575,609 | B2 | * | 6/2003 | Taniuchi et al. | 362/517 |
| 6,659,631 | B2 | * | 12/2003 | Butera et al. | 362/513 |
| 6,742,919 | B2 | * | 6/2004 | Tiesler-Wittig | 362/512 |
| 2002/0149947 | A1 | * | 10/2002 | Butera et al. | 362/513 |
| 2005/0117342 | A1 | * | 6/2005 | Perlo et al. | 362/253 |

FOREIGN PATENT DOCUMENTS

EP  0972676 A1 *  7/1998

* cited by examiner

*Primary Examiner*—John Anthony Ward
*Assistant Examiner*—David Makiya

(57) ABSTRACT

Disclosed herein is an adaptive head light assembly, comprising a parabolic reflector for housing a filament assembly; a lever arm having one end pivotably affixed to a bearing point of the parabolic reflector; an actuator in operative communication with the other end of the lever arm to actuate motion of the lever arm, wherein the actuator comprises a shape memory material adapted to change a shape orientation or modulus property upon receipt of an activation signal; and a spring in operative communication with the other end of the lever arm and adapted to provide a restoring force.

13 Claims, 8 Drawing Sheets

ADAPTIVE HEAD LIGHT AND LENS ASSEMBLIES

CROSS-REFERENCE TO RELATED APPLICATIONS

This application claims the benefit of U.S. Provisional Application Ser. No. 60/552,849 filed Mar. 12, 2004, the entire contents of which are hereby incorporated by reference.

BACKGROUND

This disclosure relates to lighting, and more particularly, to active head light and/or lens assemblies.

Current adaptive head light assemblies utilize motors and gear reductions to effect movement. The size, weight, and cost of these actuation components are prohibitive. Failure of any of the components may cause gross misalignment such that the light pattern is of little benefit to the occupant.

Reductions in weight, cost, and size are desired attributes for these types of assemblies. In addition, it is desirable to have greater functionality than can be provided by current motors and gear reductions employed for adaptive lighting assemblies.

BRIEF SUMMARY

Disclosed herein is an adaptive head light assembly, comprising a parabolic reflector for housing a filament assembly; a lever arm having one end pivotably affixed to a bearing point of the parabolic reflector; an actuator in operative communication with the other end of the lever arm to actuate motion of the lever arm, wherein the actuator comprises a shape memory material adapted to change a shape orientation or modulus property upon receipt of an activation signal; and a spring in operative communication with the other end of the lever arm and adapted to provide a restoring force.

Disclosed herein too is an adaptive head light assembly, comprising a reflector for housing a filament assembly; wherein the filament assembly comprises a filament reflector; an actuator in operative communication with the filament reflector and/or the parabolic reflector via a first discrete section of a tension wire, wherein the actuator comprises a shape memory material adapted to change the orientation of the filament reflector and/or the parabolic reflector upon receipt of an activation signal; and a spring in operative communication with a second discrete section of a tension wire, wherein the second discrete section of tension wire provides a restoring force to the filament reflector and/or the parabolic reflector.

Disclosed herein too is an adaptive head light assembly, comprising a parabolic reflector for housing a filament assembly; wherein the parabolic reflector comprises one or more discrete sections that are in slideable and/or rotary communication with one another; an actuator in operative communication with one or more discrete sections, wherein the actuator comprises a shape memory material adapted to change the orientation of the discrete section upon receipt of an activation signal; and a spring in operative communication with one or more discrete sections, wherein the spring is configured to provide a restoring force to the discrete section.

Disclosed herein too is an adaptive head light assembly, comprising a parabolic reflector for housing a filament assembly; wherein the parabolic reflector comprises one or more discrete sections; an actuator in operative communication with one or more discrete sections, wherein the actuator comprises a shape memory material adapted to change the orientation of the discrete section upon receipt of an activation signal; and a hinge in operative communication with one or more discrete sections, wherein the hinge is configured to provide a restoring force to the discrete section.

Disclosed herein too is an adaptive head light assembly, comprising a parabolic reflector for housing a filament assembly; a shade in operative communication with the parabolic reflector and an actuator, wherein the actuator comprises a shape memory material adapted to change the orientation of the shade upon receipt of an activation signal; and a spring in operative communication with the shade, wherein the spring is configured to provide a restoring force to the shade.

Disclosed herein too is a method of focusing a beam of light comprising activating an actuator; wherein the actuator comprises a shape memory material; and changing the shape and/or the orientation of a part of a head light assembly.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
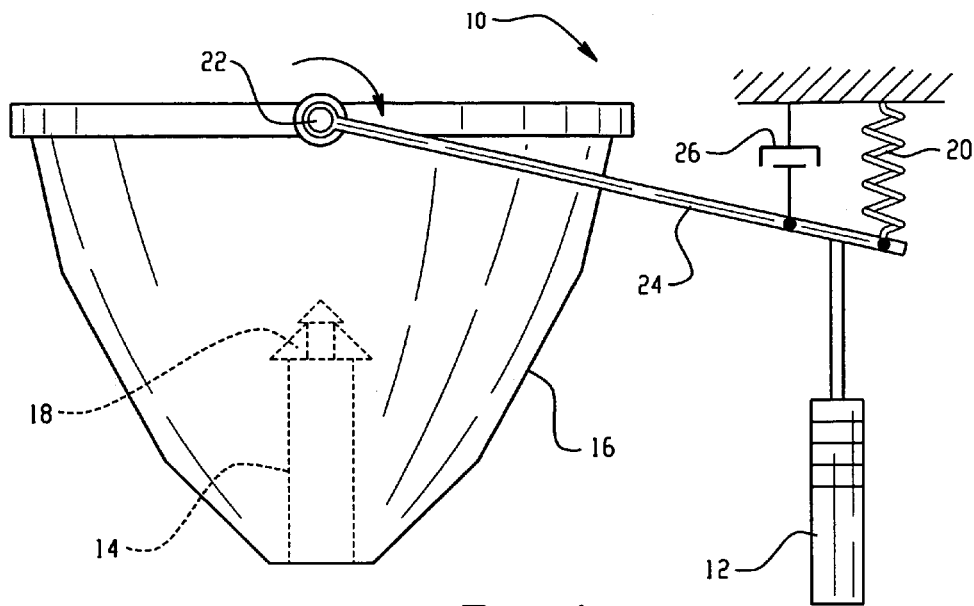
FIG. 1 illustrates one embodiment of an adaptive head light assembly 10, wherein an actuator 12 that comprises a shape memory material is utilized to rotate a reflector 16 and filament assembly 14 against the restoring force of a linear spring 20. The reflector can be a parabolic reflector or a prismatic reflector.

Disclosed herein are adaptive lighting assemblies for use in moving bodies (e.g., vehicles) that automatically optimize the beam pattern to accommodate road, driving and environmental conditions by moving, modifying, and/or adding light to the beam pattern. In another embodiment, the reflector that defines a focal path of the beam pattern is moved, morphed and/or modified to manipulate the beam pattern, focal length, and direction. In one embodiment, the adaptive head lighting assembly advantageously permits adjustment of the filament assembly to provide improved illumination patterns proportional to the turn radius and speed of the moving body. The adaptive head lighting assemblies described herein advantageously utilize a variable lens focus and/or head light movement in order to reduce glare to oncoming traffic. In addition, lighting can be varied as a function of road conditions, e.g., dry, wet, snow, and the like.

The various assemblies disclosed herein advantageously employ active materials based actuators to effect manipulation of the filament assembly and/or the reflector thereby assisting or eliminating the use of motors and/or gears. As a result of the use of active materials, the lighting systems can have a reduced weight and size. The adaptive head light assemblies can also be manufactured at lower cost when compared with existing commercially available systems. The term "adaptive" as used herein refers to a controlled transformation or reorientation of a portion of the head light assembly. The term "transformation" as applied to reflectors refers to a change in shape or dimensions. The reflector can have a suitable geometry. Exemplary reflectors are parabolic reflectors, prismatic reflectors, or the like. While all of the Figures described herein are depicted to have parabolic reflectors, other types of reflectors, such as, for example, prismatic reflectors can be used as well.

The reduction of moving parts in the adaptive head light assemblies lead to a reduction in the rate of failure since there are fewer mechanical and electrical attachments, connections, and load-transferring interfaces. In addition, unlike current motor driven head lights, failure of the active material will often cause the head light and/or lens in the adaptive head light assembly to revert back to its original position, e.g., a head-on position.

Among the set of suitable active materials are those referred to herein as shape memory materials, wherein the shape and/or modulus properties can be selectively varied by means of an activation signal. Shape memory materials generally refer to materials or compositions that have the ability to remember their original shape, which can subsequently be recalled by applying an external stimulus, i.e., the activation signal. As such, deformation of the shape memory material from the original shape can be a temporary condition, which can be used for fixturing a variety of workpieces having different surface contours. Exemplary shape memory materials suitable for use in the present disclosure include shape memory alloys and ferromagnetic shape memory alloys and composites of the foregoing shape memory materials with non-shape memory materials, and combinations comprising at least one of the foregoing shape memory materials. In another embodiment, the class of smart materials used in the adaptive head light assemblies are those that change their shape in proportion to the strength of the applied field but then return to their original shape upon the discontinuation of the field.

Suitable smart materials include, but are not intended to be limited to, shape memory alloys (SMA), shape memory polymers (SMP), electroactive polymers (EAP), ferromagnetic SMAs, electrorheological fluids (ER), magnetorheological fluids (MR), dielectric elastomers, ionic polymer metal composites (IPMC), piezoelectric polymers, piezoelectric ceramics, various combinations of the foregoing materials, and the like. Of these materials, preferred actuators are based on shape memory alloys. For example, SMA actuators may be in the form of a spring, wire or similar form that has a mechanical response upon the application or removal of heat. SMA actuators are generally only operable in a single direction, although two way shape memory alloys are now available. Preferably, SMA actuators are provided in pairs or in opposition to another biasing means to cause the opposed rotation about the joint when desired. The preferred source of heat to the shape memory alloy actuators is through the provision of electrical energy to the wire to create heat through the resistance of the SMA actuator itself. The smart material may be integrated within a head light and/or lens structures to effect movement or in other embodiments may define the lens structure such that the surface is adaptable. The lens structure refers to the reflectors.

For example, force/displacement actuators can be fabricated with shape memory alloy wires and ribbons. They are generally driven by Joule heating or air convection. These types of actuators can produce work (force over some displacement) when a thermally-induced phase transformation occurs.

FIG. 1 illustrates one embodiment of an adaptive head light assembly generally designated 10, wherein an actuator 12 that comprises a shape memory material is utilized to rotate a parabolic reflector 16 and filament assembly 14 against the restoring force of a linear spring 20. The adaptive head light assemblies illustrated in the figures of this disclosure are exemplary only and are not intended to be limited to any particular shape, size, configuration, or the like. The adaptive head light assembly 10 of the FIG. 1 can be configured for pivotable rotation of the entire assembly 10 about a pivot 22 affixed to a bearing point The smart material actuator 12 is preferably a SMA actuator. A lever arm 24 is fixedly attached to (or is an existing, integral part of) one end of the adaptive head light assembly 10 at the pivot 22. Movement of the lever arm 24 about The pivot 22 promotes rotation of the parabolic reflector 16 and filament assembly 14. The other end of the lever arm 24 is in operative communication with the actuator 12. A linear spring 20 is in operative communication with the same end of the lever arm 24 to provide a restoring force. The restoring force of the spring 20 acts in opposition to the displacing force provided by the actuator 12. As detailed in the FIGS. 2 and 3 below, two or more actuators can be utilized in combination to provide a full range of motion. An optional damper 26 can be used to control vibration and jitter that occurs during the positioning of the adaptive head light assembly 10.

In one embodiment, in one method of operating the adaptive head light assembly 10 depicted in the FIG. 1, when an external stimulus is provided to the actuator 16, the lever arm 24 is displaced. The displacement is brought about by the shape memory material, which upon activation attempts to return to its original shape and/or size. In this manner, arbitrary rotation without a motor can be effected.

In one embodiment, if the shape memory material is a shape memory alloy, activation can be effected by resistively heating the actuator 16. Supplying an electrical current to the actuator 16 can effect resistive heating. After the activation signal is removed, the linear spring 20 can return the adaptive head light assembly 10 to its original position. In one embodiment, the activating signal can be synchronized with the motion of a steering wheel (not shown) of the vehicle. Thus when the steering wheel is rotated, an appropriate activating signal is provided to the actuator 16, which facilitates the rotating of the adaptive head light assembly 10. Other inputs, such as, for example, turning radius sensor inputs, oncoming traffic sensor inputs, environmental condition sensor inputs, and the like can also be used to effect displacement of the adaptive head light assembly 10.

As noted above, the actuator 16 can comprise a shape memory alloy. Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their flexural modulus (stiffness), yield strength, and shape orientation are altered as a function of temperature. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon cooling are referred to as having two-way shape memory behavior.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating.

Intrinsic and extrinsic two-way shape memory alloys are characterized by a shape transition both upon heating from the martensite phase to the austenite phase, as well as an additional shape transition upon cooling from the austenite phase back to the martensite phase. Actuators that exhibit an intrinsic one-way shape memory effect are fabricated from a shape memory alloy composition that will cause the actuators to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, actuators that exhibit the extrinsic two-way shape memory effects are composite or multi-component materials that combine a shape memory alloy composition that exhibits a one-way effect with another element (e.g., a spring) that provides a restoring force to return the first plate another position or to its original position.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the alloy composition.

Suitable shape memory alloy materials for fabricating the actuators include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, or the like, or a combination comprising at least one of the foregoing shape memory alloys. The alloys can be binary, ternary, or any higher order so long as the alloy composition exhibits a shape memory effect, e.g., change in shape orientation, changes in yield strength, and/or flexural modulus properties, damping capacity, and the like.

The thermal activation signal may be applied to the shape memory alloy in various ways. It is generally, desirable for the thermal activation signal to promote a change in the temperature of the shape memory alloy, to a temperature greater than or equal to its austenitic transition temperature. Suitable examples of such thermal activation signals that can promote a change in temperature are the use of steam, hot oil, resistive electrical heating, conduction, or the like, or a combination comprising at least one of the foregoing signals. A preferred thermal activation signal is one derived from resistive electrical heating.

The actuator 16 may also comprise an electrically active polymer. Electrically active polymers are also commonly known as electroactive polymers (EAP's). The key design feature of devices based on these materials is the use of compliant electrodes that enable polymer films to expand or contract in the in-plane directions in response to applied electric fields or mechanical stresses. When EAP's are used as the actuator 16, strains of greater than or equal to about 100%, pressures greater than or equal to about 50 kilograms/square centimeter (kg/cm2) can be developed in response to an applied voltage. The good electromechanical response of these materials, as well as other characteristics such as good environmental tolerance and long-term durability, make them suitable for actuators under a variety of manufacturing conditions.

Electroactive polymer coatings used in adaptive head light assembly 10 may be selected based on one or more material properties such as a high electrical breakdown strength, a low modulus of elasticity-(for large or small deformations), a high dielectric constant, or the like. In one embodiment, a polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The electroactive polymers used herein, are generally conjugated polymers. Suitable examples of EAP's are poly (aniline), substituted poly(aniline)s, polycarbazoles, substituted polycarbazoles, polyindoles, poly(pyrrole)s, substituted poly(pyrrole)s, poly(thiophene)s, substituted poly (thiophene)s, poly(acetylene)s, poly(ethylene dioxythiophene)s, poly(ethylenedioxypyrrole)s, poly(p-phenylene vinylene)s, or the like, or combinations comprising at least one of the foregoing EAP's. Blends or copolymers or composites of the foregoing EAP's may also be used. Similarly blends or copolymers or composites of an EAP with an EAP precursor may also be used.

Figure 2:
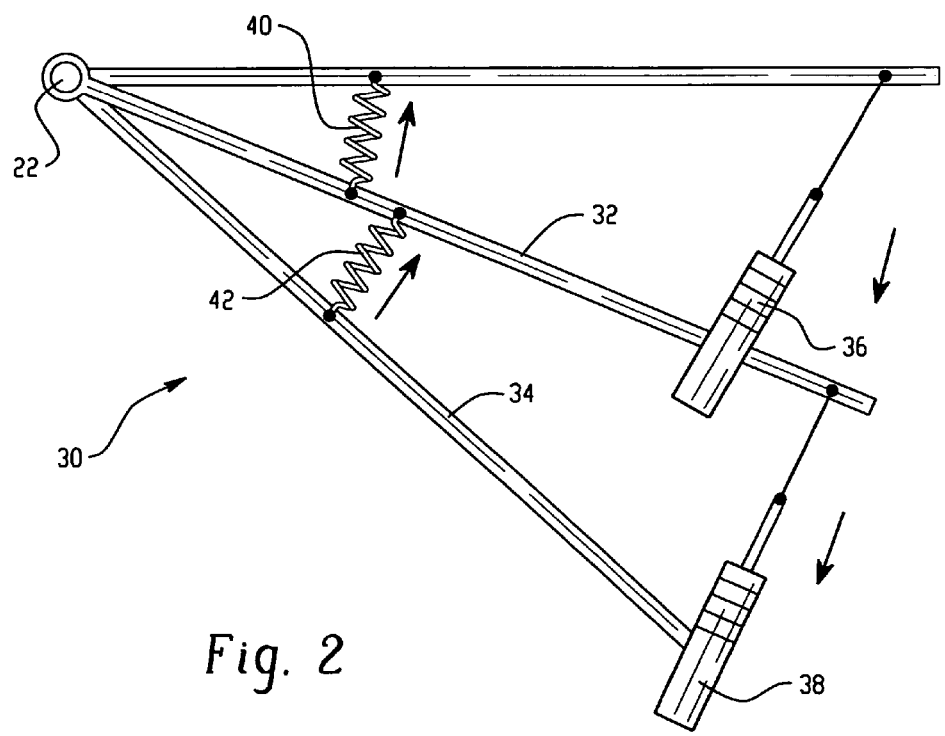
FIG. 2 depicts a cascading actuator assembly 30 comprising a first lever arm 32 and second lever arm 34 both of which can be in pivotable communication with the adaptive head light assembly 10 of FIG. 1 via the pivot 22.
Figure 3:
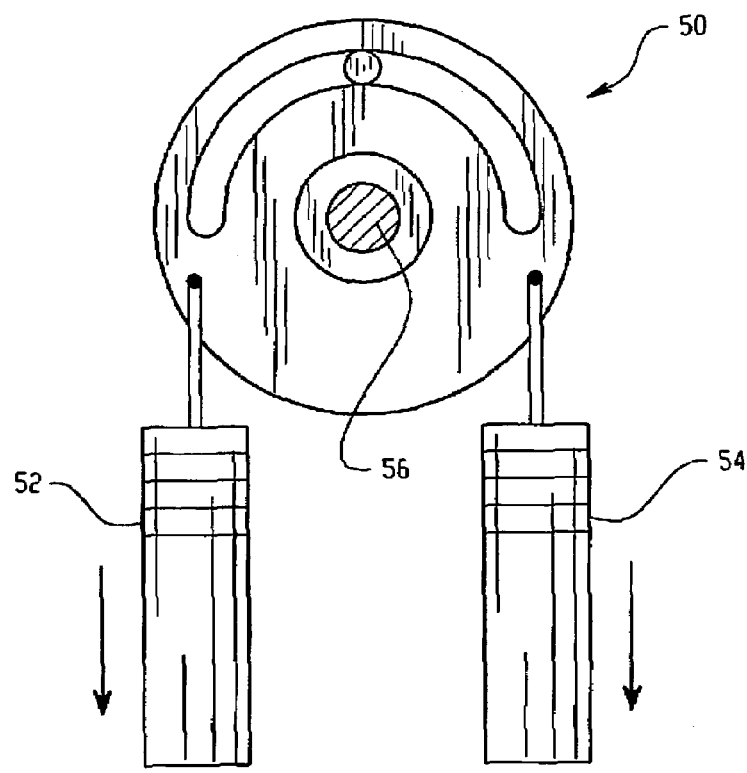
FIG. 3 illustrates another exemplary depiction of a dual actuator assembly 50 comprising two actuators 52 and 54 respectively that act in opposition to each other.

FIGS. 2 and 3 illustrate alternative exemplary embodiments for rectifying the stroke and force. FIG. 2 depicts a cascading actuator assembly 30 comprising a first lever arm 32 and second lever arm 34 both having one end which is in pivotable communication with the adaptive head light assembly 10 (not shown) via the pivot 22. Each end of the lever arms 32 and 34 that is opposed to the end in communication with the pivot is in operative communication with actuators 36 and 38 respectively. The actuators 36 and 38 can be manufactured from the same or different shape memory materials. The arms are also in communication with linear springs 40 and 42, which restore the lever arms 32 and 34 to their original positions after displacement. More than two actuators and/or springs can be used if desired to vary the displacement of the adaptive head light assembly 10.

In one embodiment, in one method of operating the cascading actuator assembly 30, an activating signal can be simultaneously or sequentially applied to both actuators, to displace the adaptive head light assembly 10. In another embodiment, an activating signal of a first strength can be used to activate the actuator 36, while an activating signal of a second strength can be used to activate the actuator 38, thereby providing incremental displacement to the adaptive head light assembly. As with the assembly depicted in FIG. 1, the springs 40 and 42 facilitate the return of the adaptive head light assembly 10 to its original position upon removal or discontinuity of the activating signal.

FIG. 3 is another exemplary depiction of a dual actuator assembly 50 comprising two actuators 52 and 54 respectively. The actuators 52 and 54 act in opposition to each other. The actuators 52 and 54 can be rotatably disposed around a pulley 56 if desired. In one embodiment, the actuators 52 and 54 can be attached to the pivot point using compound cams, thereby enabling positive and negative rotation without engaging both actuators simultaneously. A restoring force can be created with a torsional spring (not shown). In this embodiment, the opposing action of the actuators 52 and 54 can be used to control the motion of the adaptive head light assembly 10 (not shown). In another embodiment, the dual actuator assembly can be in operative communication with the parabolic reflector (not shown) of the light assembly to facilitate positioning of the adaptive head light assembly 10. The dual actuator assemblies displayed in the FIGS. 2 and 3 can advantageously be used to displace the adaptive head light assembly 10 in mutually opposite directions. They can also be advantageously used to displace the adaptive head light assembly 10 in small increments if desired.

Figure 4:
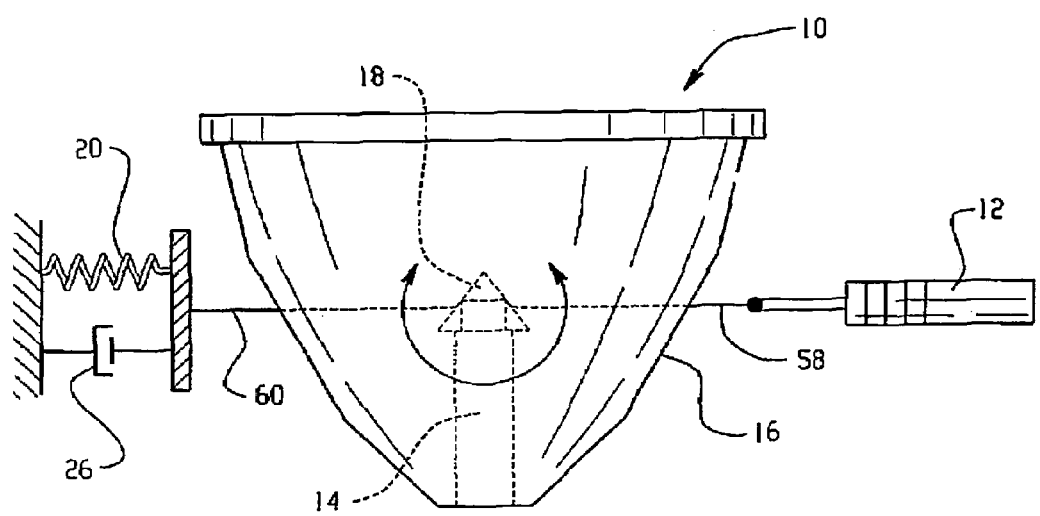
FIG. 4 illustrates another exemplary embodiment of an adaptive head light assembly 10, wherein light emanating from the filament assembly 14 is redirected onto the reflector 16 by rotation of the filament reflector 18. The reflector can be a parabolic reflector or a prismatic reflector.

FIG. 4 illustrates yet another exemplary embodiment of a adaptive head light assembly 10, wherein light emanating from the filament assembly 14 is redirected onto the parabolic reflector 16 by rotation of the filament reflector 18. A first discrete section of a tension wire 58 is in operative communication with the actuator 12 and the filament reflector 18. An optional second discrete section of the tension wire 60 is in operative communication with the spring 20 and the filament reflector 18. The second discrete section is generally is disposed on an opposing surface of the filament reflector 18 from the surface that is in communication with the first discrete section 58.

In the embodiment depicted in the FIG. 4, activation of the actuator 16 promotes displacement of the filament reflector 18. Upon removal or discontinuity of the activating signal, the film reflector 18 is returned to its original position by the restoring force of the spring 20. As previously discussed, the configuration is relatively compact compared to assemblies that utilize motors. Failure of the assembly restores the filament to a head-on position. As before, the use of two or more actuators are preferred for providing positive and negative, or greater rotational movement.

Figure 5:
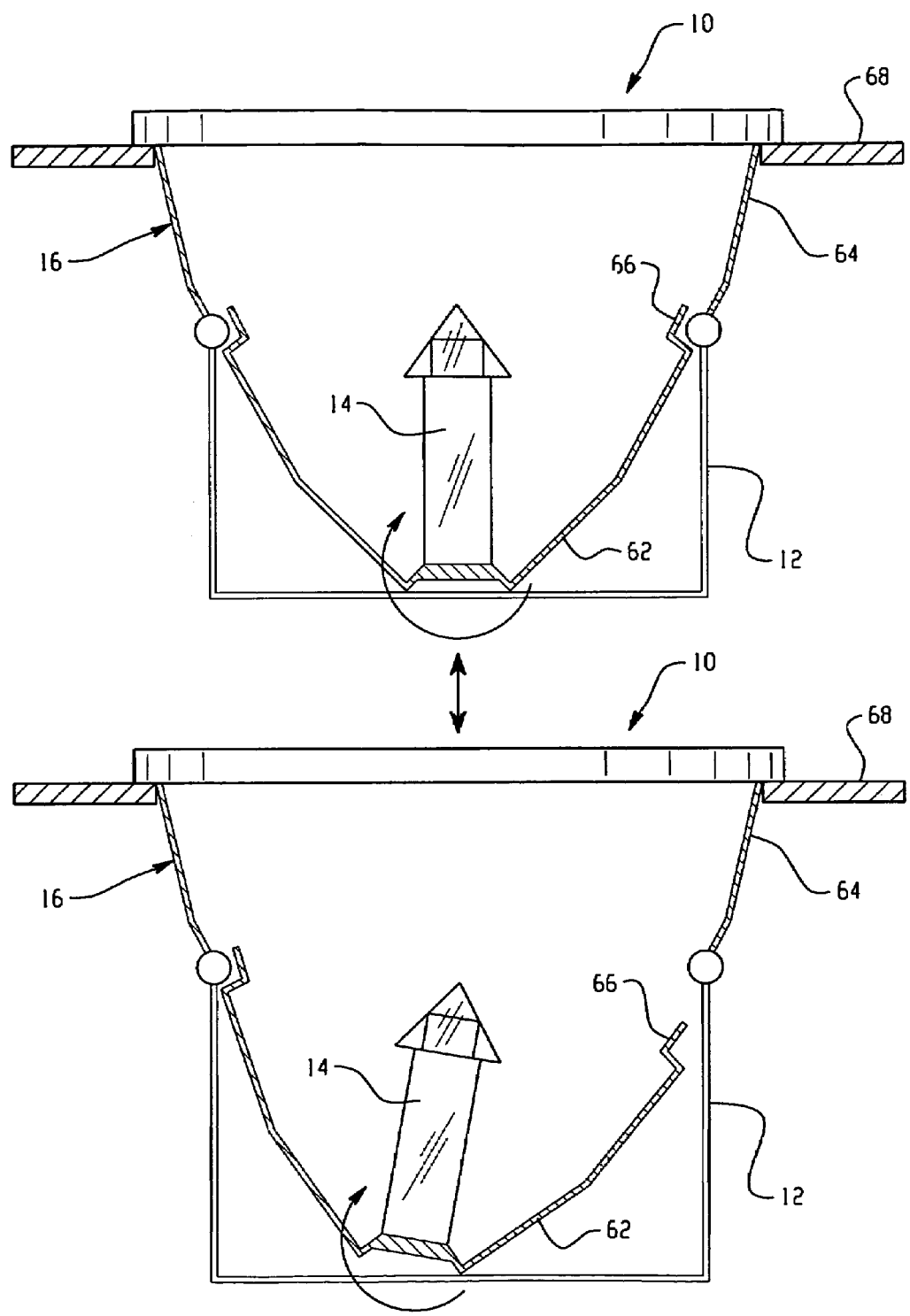
FIG. 5 illustrates another exemplary embodiment of an adaptive head light assembly 10, wherein light is actively directed by rotating a portion of the parabolic reflector 16 along with the filament assembly 14.

FIG. 5 illustrates another exemplary embodiment of an adaptive head light assembly 10, wherein light is actively directed by rotating a portion of the parabolic reflector. The parabolic reflector 16 comprises one or more discrete sections each of which are in slideable communication and/or rotatable communication with one another. Each discrete section can slide and/or rotate with an adjacent section.

With reference now again to the FIG. 5, the exemplary parabolic reflector 16 comprises a first discrete section 62 and a second discrete section 64. The first discrete section 62 is disposed to the rear of the parabolic reflector 16 and is fixedly attached to the filament assembly 14. The first discrete section 62 has disposed at its circumferential edge a flange 66 that is in operative communication with one circumferential edge of the second discrete section 64. The flange 66 is flexible and can be deformed to permit slideable and rotary communication between the first and second discrete sections. The first discrete section 62 is also in operative communication with an actuator 12 that facilitates the displacement of the first discrete section 62 with respect to the second discrete section 64. The actuator 12 is preferably a wire. A linear spring (not shown) is preferably utilized in combination with the smart material actuator to facilitate the restoration of the first discrete section 62 to its original position. Optionally, a motion guide can be utilized to guide the motion of the first discrete section with respect to the second discrete section.

The second discrete section 64 is fixedly attached to the housing 68 of the adaptive head light assembly 10 and is immobile. The first discrete section 62 is mobile and is in slideable and rotary communication with the second discrete section 64. Upon activating the actuator 16, the first discrete section 62 along with the filament assembly 14 is displaced with respect to the second discrete section 64, thereby directing the light beam. Alternatively, the filament assembly 14 can be rotated within the first discrete section to effect a displacement that changes the beam focal length as a function of displacement.

The embodiment displayed in the FIG. 5 is advantageous that the power consumption is low when compared with other commercially available head light assemblies that utilize motors. It also uses proportional control to facilitate displacement of the beam, i.e., the magnitude of the activation signal can be used to determine the displacement of the beam. Failure of the actuator advantageously leaves the system in a head-on position. It can also be used to produce simultaneous vertical rotation.

Figure 6:
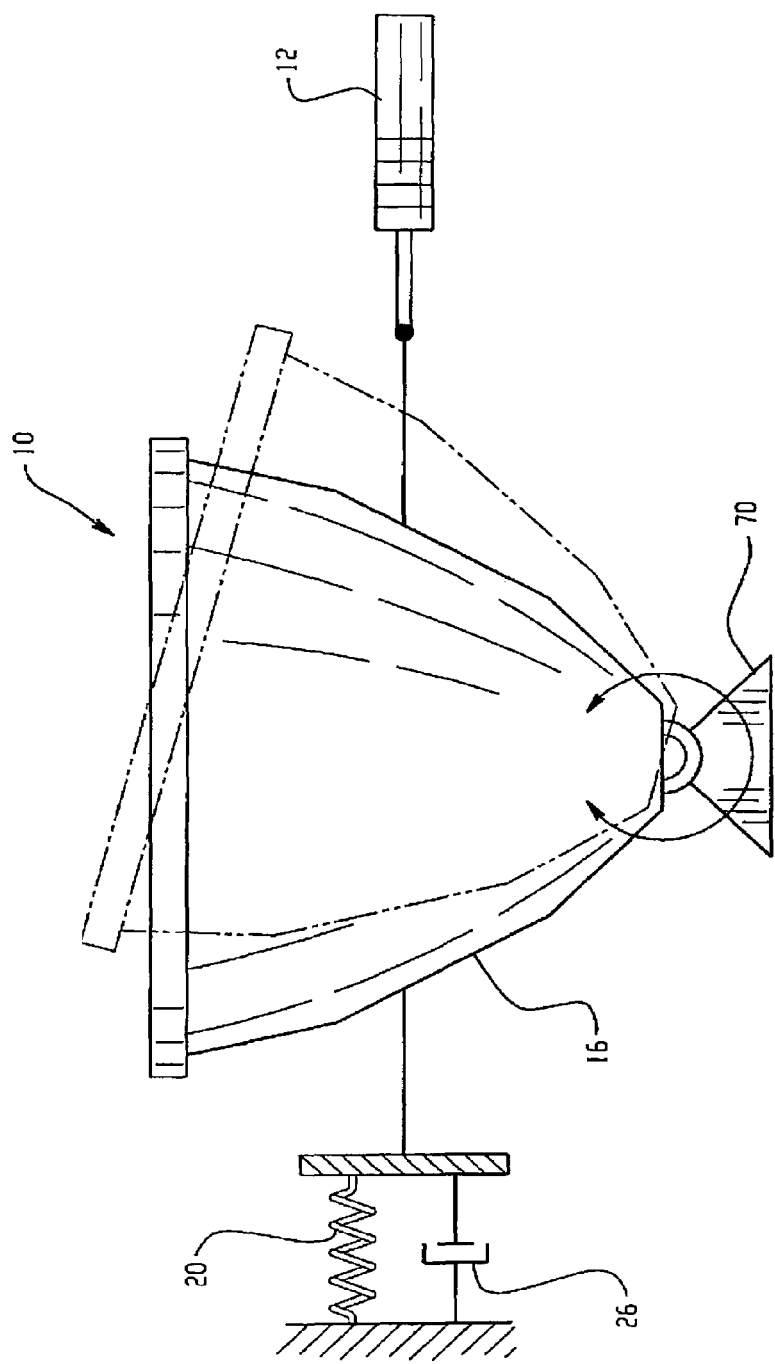
FIG. 6 illustrates another exemplary embodiment of an adaptive head light assembly 10 wherein light is actively directed by rotating the parabolic reflector 16 independent of the filament assembly 14.

FIG. 6 illustrates another exemplary embodiment of an adaptive head light assembly 10 wherein light is actively directed by rotating the parabolic reflector 16 independent of the filament assembly 14. Movement of the parabolic reflector 16 controls the direction of the light beam. In this embodiment, the parabolic reflector 16 is in pivotable and rotary communication with a pivot affixed to a frame 70 adjacent to the parabolic reflector 16. The parabolic reflector 16 is in operative communication with an actuator 12 that can displace the parabolic reflector 16 upon activation. The filament assembly 14 is independent of the motion of the parabolic reflector 16 and remains undisturbed in its original position. The actuator 12 preferably comprises a shape memory alloy. Multiple actuators can be used if desired. A linear spring 20 facilitates the return of the parabolic reflector 16 to its original position. Torsion springs can also be used to facilitate the return of the parabolic reflector.

Figure 7:
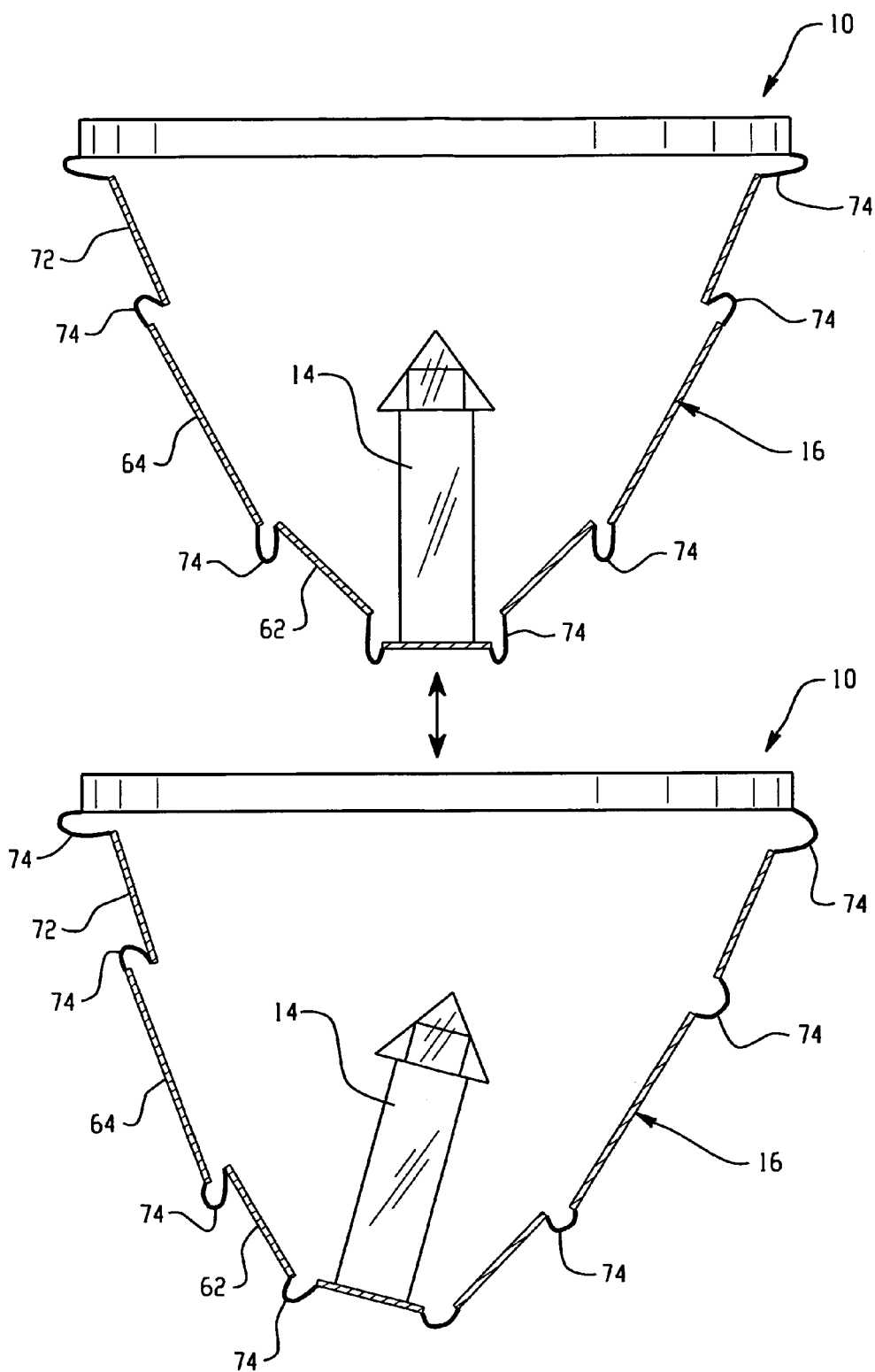
FIG. 7 illustrates yet another exemplary embodiment of adaptive head light assembly 10, wherein light is redirected by reforming discrete sections of the parabolic reflector 16 using discrete or distributed actuation.

FIG. 7 illustrates yet another exemplary embodiment of adaptive head light assembly 10, wherein light is redirected by reforming discrete sections of the parabolic reflector 16 using discrete or distributed actuation. The parabolic reflector 16 of FIG. 7 comprises discrete sections that can be activated independently of each other to direct the beam of light in a desired direction. With reference to the FIG. 7, the parabolic reflector comprises a first discrete section 62 in operative communication with a second discrete section 64, which is in operative communication with a third discrete section 72. A hinge 74 can be advantageously to facilitate contact between any two discrete sections. In an exemplary embodiment, the elastic hinge 74 permits the discrete sections to be independently manipulated. The elastic hinge 74 also provides a biasing or return force after the activation is removed or discontinued. In this manner, the focal length of the beam pattern can be changed. Multiple actuators can provide complex light solutions as desired.

In one embodiment, the discrete sections of the parabolic reflector can be manufactured from typical materials and connected to one another using elastic hinges. Each discrete section can be connected to adjacent sections via an active material actuator (not shown) such that the combined contraction or extension of the active material will result in a controlled reconfiguration of the parabolic reflector in three dimensions.

In the embodiment depicted in the FIG. 7, the application of an activating signal to a discrete section promotes a displacement of the filament assembly 14, which facilitates a redirecting of the beam. In yet another embodiment (not depicted), the filament assembly can be fixedly attached to an independent reference frame, such that upon application of an activating signal to a discrete section of the parabolic reflector 16, the activated discrete section and any adjacent sections will undergo morphing.

As noted above, the hinge 74 can be used to facilitate restoration of the parabolic assembly to its original shape and/or position. The hinge 74 is preferably manufactured from an elastomer that can deform when a discrete section of the parabolic reflector 16 is activated. In one embodiment, the hinge 74 can be manufactured from an electrically conductive elastomer that can be used to transmit and external stimulus such as an electrical current to a discrete section of the parabolic reflector 16. As noted above, the embodiment depicted in the FIG. 7 can utilize multiple actuators to permit rotation along a horizontal and/or a vertical axis. The system is advantageous in that it utilizes low power consumption and does not utilize any gearing.

In another embodiment, the discrete sections of the parabolic reflector can be manufactured from different shape memory alloys and can serve as actuators. Thus different activation signals may be applied to each discrete section to effect reconfiguration of the beam. In another embodiment, while the discrete sections of the parabolic reflector can be manufactured from the same material, each discrete section can be disposed upon a different shape memory material. For example, the first discrete section 62 can comprise a reflective coating disposed upon a shape memory alloy, while the second discrete section 64 can comprise a reflective coating disposed upon an electroactive polymer.

Figure 8:
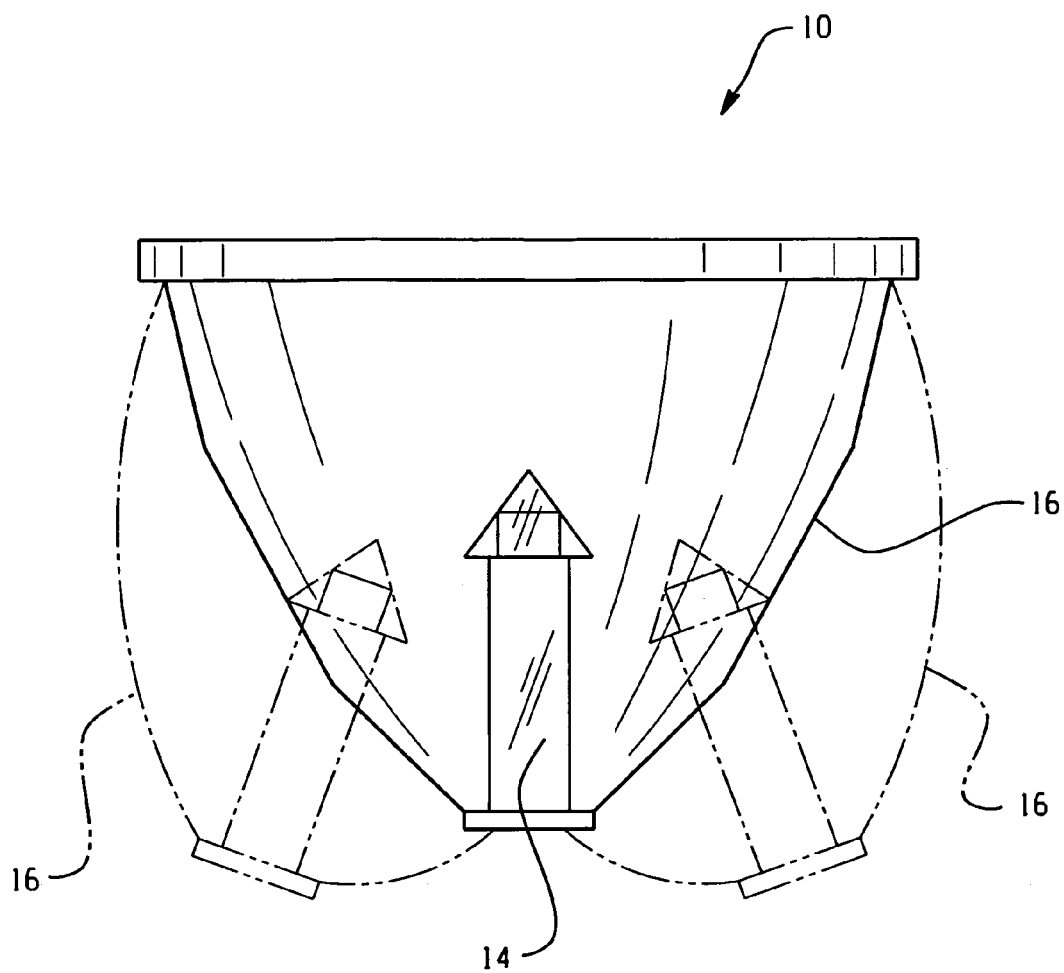
FIG. 8 illustrates another embodiment of adaptive head light assembly 10, wherein the light beam is redirected by reconfiguring the parabolic reflector 16.

FIG. 8 illustrates another embodiment of adaptive head light assembly 10, wherein the light beam is redirected by reconfiguring the parabolic reflector 16. The parabolic reflector 16 may be fabricated from a material capable of large, reversible deformations and coated with a reflective surface or alternatively, the parabolic reflector 16 can be made to have multiple discrete configurations that are controlled by means of the actuators that comprise shape memory materials. In one embodiment the reflector can be a composite. In another embodiment, reconfigurable composite materials having embedded internal actuation can be used as the reflector. In a self-configurable reflector, the reflector can move between various positions without use of external actuators.

In one embodiment, discrete sections of the parabolic reflector 16 can be manufactured from different shape memory materials. The surface of the discrete sections that are illuminated by the light can be coated with a reflective material, while the opposing surface can be in operative communication with an actuator that facilitates a displacement of any desired discrete section upon application of an activating signal. This system advantageously permits reconfiguration of the entire reflector upon activation. A linear spring (not shown) can be used to restore the parabolic reflector 16 to its original position.

Figure 9:
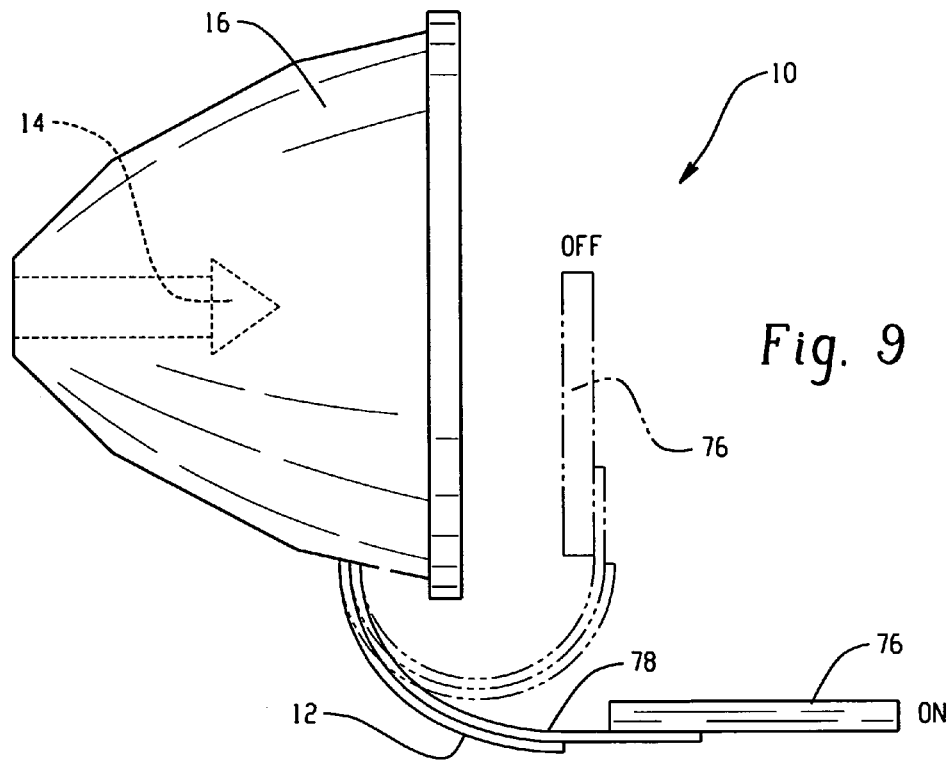
FIG. 9 is a depiction of a shade 76 in operative communication with the parabolic reflector 16 via an actuator 12. The shade is deployed to reduce the intensity of light emanating from the head light.

While the aforementioned embodiments detail adaptive head light assemblies that deform the parabolic reflector or displace the filament assembly in response to an activation signal, the light emanating from a head light assembly can also be controlled or adjusted by employing a shutter system that can be selectively deployed at the desire of the user. In one exemplary embodiment, a shade can be advantageously deployed to reduce the intensity of light emanating from the head light. FIG. 9 reflects one exemplary embodiment, wherein a shade 76 is in operative communication with the parabolic reflector 16 via an actuator 12. The actuator 12 generally comprises a shape memory alloy. The actuator 12 can be in the form of a wire. A length of semi-circular torsion spring 78 manufactured from an appropriate metal such as, for example, spring steel provides the restoring force. Both, the actuator 12 and the torsion spring 78 are in operative communication with the parabolic reflector 16 and the shade 76. Upon heating, the shape memory alloy wires will contract and cause the torsion spring 78 to deform resulting in a rotation of the shade into the path of the light beam. Upon cooling, the torsion spring 78, which has a higher spring constant than the deactivated shape memory alloy wire, will return to the original vertical position while straining the shape memory alloy wires.

Figure 10:
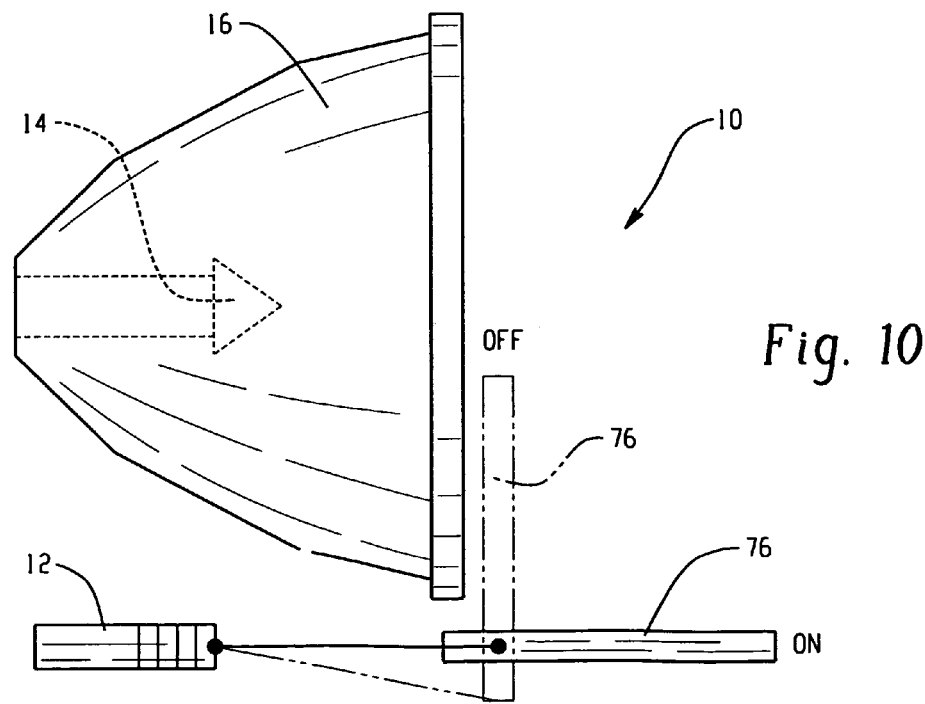
FIG. 10 is another depiction of a shade 76 in operative communication with the parabolic reflector 16 via an actuator 12. The shade is deployed to reduce the intensity of light emanating from the head light.

In yet another embodiment depicted in the FIG. 10, the shade 76 can rotate pivotably and is in operative communication with an actuator 12. The actuator 12 applies a force at one end of the shade causing a rotation of the shade about the pivot, which results in a rotation of the shade out of the path of the light beam. A return spring restores the shade to its upright position when the power to the actuator 12 is discontinued.

The shade detailed in the FIGS. 9 and 10 can be customized to tailor the reflected light to the desires of the user. In one embodiment, the shade can have a transmissivity to light of up to about 100%. In another embodiment, the inward face of the shade could be made reflective to return light back into the reflector when in the blocking position, and to redirect light (outwards) when in the open position. For example, different parts of the reflector would be configured for low or high beam, where the high beam is blocked off by the shade, which recycles the light by reflection to the surface shaped for low beam. When high beam is required, the shade is moved out of the way.

Figure 11:
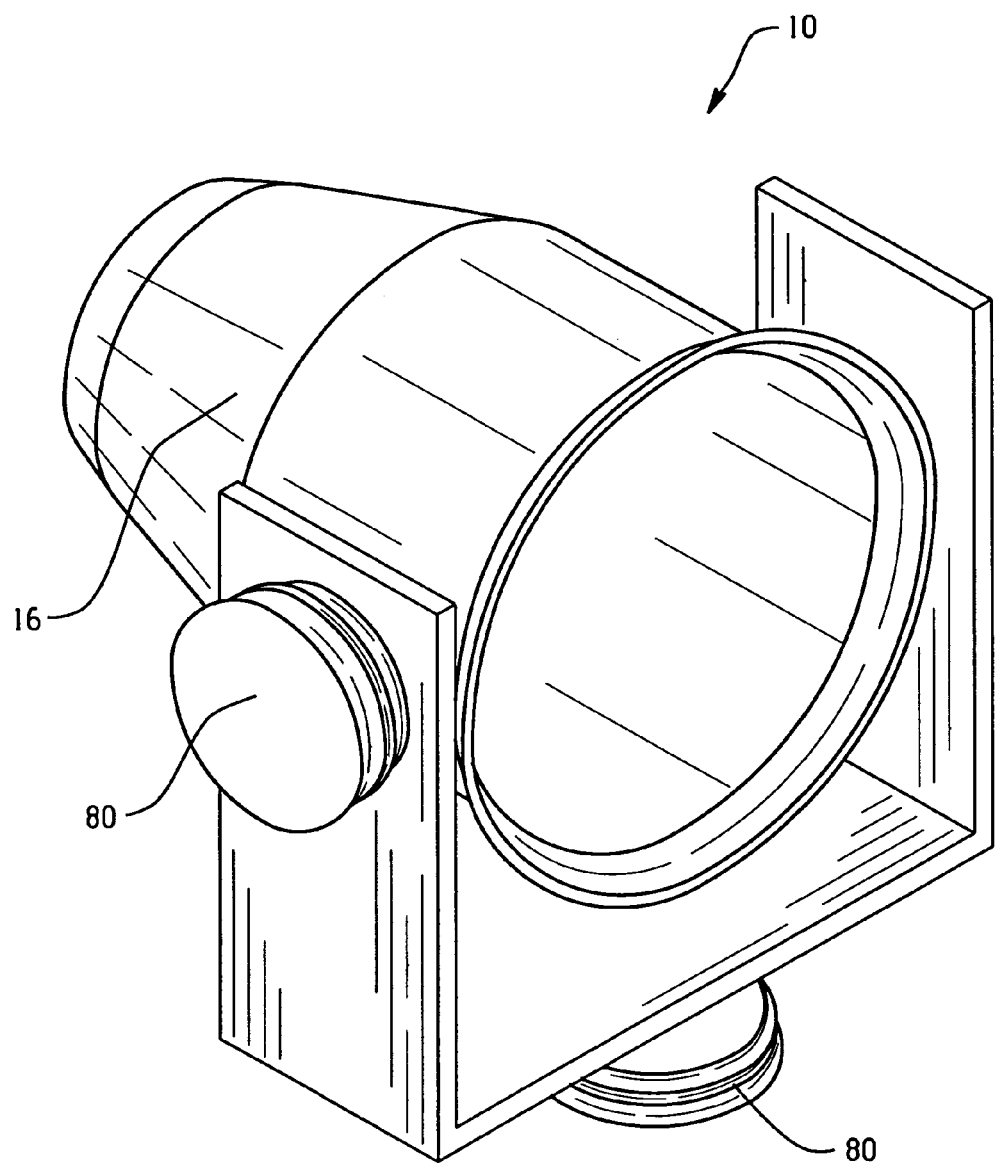
FIG. 11 illustrates another embodiment of an adaptive head light assembly 10, wherein the head light assembly is modified by piezoelectric ultrasonic motors 80.

FIG. 11 illustrates another embodiment of an adaptive head light assembly 10, wherein the head light assembly is directly driven by piezoelectric ultrasonic motors 80. In this embodiment, a (bi-directional) rotary type piezoelectric ultrasonic motor is affixed to the head light assembly 10. These motors produce high torque at low speed, which eliminates the need for gear reduction. Because these motors are also mechanically robust they can be affixed directly into the head light assembly, enabling more compact and space-saving structures. Ultrasonic motors are nearly silent, which ensures that the passenger will not hear the motors when active.

In all of the aforementioned embodiments, a controller is in operative communication with the actuators. The controller may include further inputs from the desired system in which the loop is intended to function with. For example, speed sensor inputs may be utilized, turning radius sensor inputs, oncoming traffic sensor inputs, environmental condition sensor inputs, and the like. The sensors are preferably configured to provide input information to the controller, which then actuates the head light assembly and or lens assembly under pre-programmed conditions defined by an algorithm or the like.

As a result of utilizing a shape memory alloy in the actuator a significant reduction in size is realized in contrast to conventional motor driven head light assemblies. Moreover, the energy requirements to drive actuation are significantly less than motor driven actuation. Gearing can be optionally utilized. Failure generally the head light in the head-on position. The actuation using shape memory materials can be advantageously used to rotate the parabolic reflector and/or the filament assembly about a horizontal and/or a vertical axis.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An adaptive head light assembly, comprising:
a parabolic reflector for housing a filament assembly; wherein the parabolic reflector comprises one or more discrete sections that are in slideable and/or rotary communication with one another;
an actuator in operative communication with one or more discrete sections, wherein the actuator comprises a shape memory material that changes the orientation of the discrete section upon receipt of an activation signal; and
a spring in operative communication with one or more discrete sections, wherein the spring provides a restoring force to the discrete section.

2. The head light assembly of claim 1, wherein the parabolic reflector comprises a first discrete section and a second discrete section, and wherein the first discrete section and the second discrete section are in slideable and/or rotary communication with each other.

3. The head light assembly of claim 2, wherein the first discrete section comprises a flange that is in operative communication with a circumferential edge of the second discrete section.

4. The head light assembly of claim 2, wherein the first discrete section is comprises the rear of the parabolic reflector, while the second discrete section is fixedly attached to a housing.

5. The head light assembly of claim 2, wherein a guide facilitates the motion of the first discrete section.

6. An adaptive head light assembly, comprising:
a parabolic reflector for housing a filament assembly; wherein the parabolic reflector comprises one or more discrete sections;
an actuator in operative communication with one or more discrete sections, wherein the actuator comprises a shape memory material that changes the orientation of the discrete section upon receipt of an activation signal; and
a hinge in operative communication with one or more discrete sections, wherein the hinge provides a restoring force to the discrete section.

7. The adaptive head light assembly of claim 6, wherein the shape memory material is a shape memory alloy.

8. The adaptive head light assembly of claim 6, wherein the hinge comprises an electrically conducting elastomer that transmits the activation signal to one or more discrete sections.

9. The adaptive head light assembly of claim 6, wherein the discrete section is the actuator.

10. The adaptive head light assembly of claim 6, wherein the filament assembly is fixedly attached to a housing external to the adaptive head light assembly.

11. An adaptive head light assembly, comprising:
   a parabolic reflector for housing a filament assembly;
   a single shade in operative communication with the parabolic reflector and an actuator, wherein the actuator comprises a shape memory material that changes the orientation of the shade upon receipt of an activation signal, wherein the orientation of the single shade is adjacent to and does not obstruct an opening of the parabolic reflector in an absence of the activation signal and is positioned to obstruct at least a portion of the opening defined by the parabolic reflector upon receipt of the activation signal; and
   a spring in operative communication with the single shade, wherein the spring provides a restoring force to the shade to position the shade adjacent to the parabolic reflector in the absence of the activation signal.

12. The adaptive head light assembly of claim 11, wherein the spring is a torsion spring.

13. The adaptive head light assembly of claim 11, wherein the shade is disposed about a pivot, wherein the pivot is adjacent to the parabolic reflector.

* * * * *